United States Patent Office 3,085,013
Patented Apr. 9, 1963

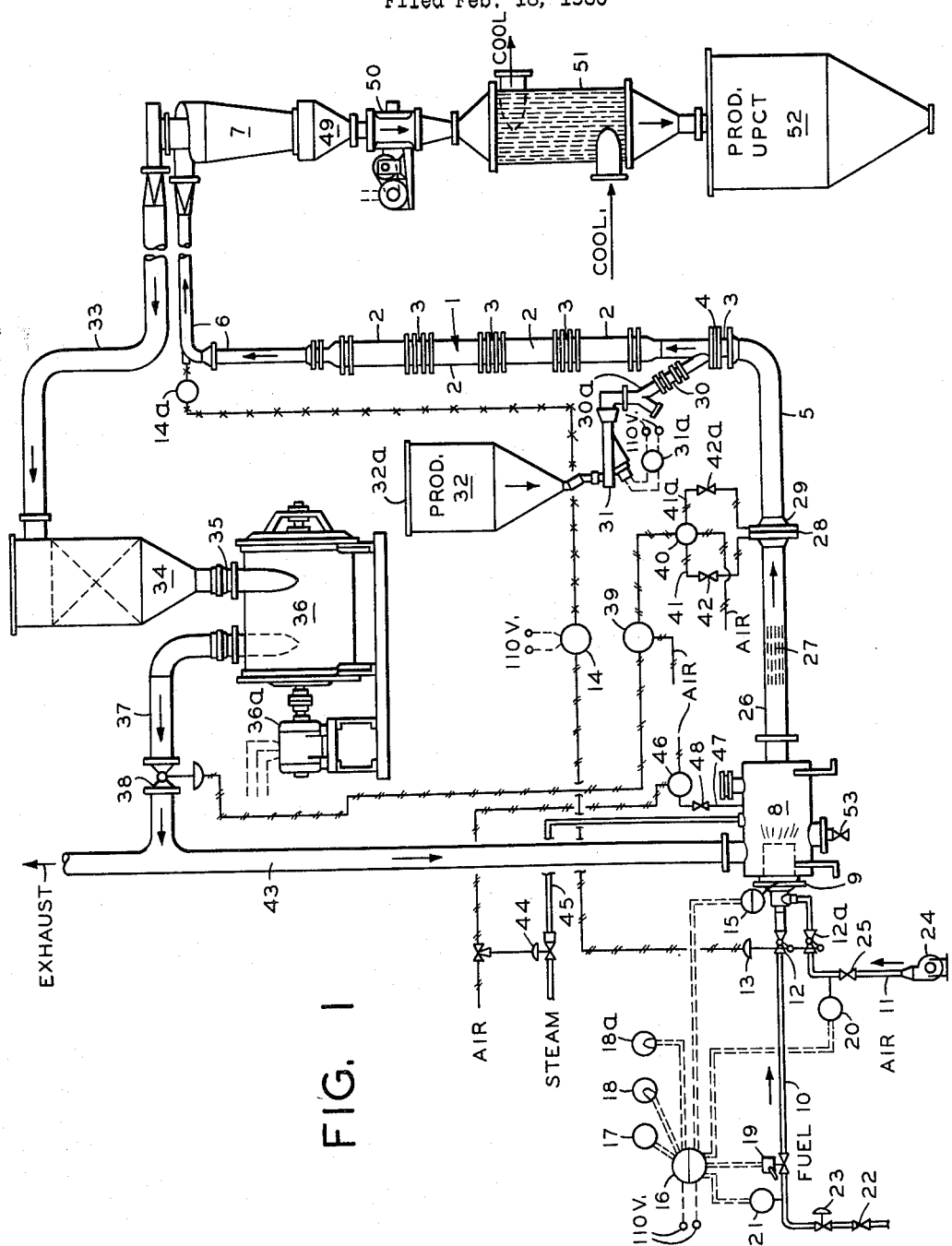

3,085,013
PROCESS OF PREPARING A RICE PRODUCT
Truman B. Wayne, P.O. Box 13086, Houston, Tex.
Filed Feb. 18, 1960, Ser. No. 9,578
8 Claims. (Cl. 99—81)

This invention relates a process for manufacturing a cereal product prepared from rice which has been substantially gelatinized by parboiling the paddy or rough rice prior to removal of the hulls, or by precooking of brown or milled clean rice subsequent to the removal of hulls. In either case, the parboiled or precooked rice is dried to a final moisture content of between 10 and 20 percent, and preferably within the range of 12 to 15 percent moisture, before it is introduced into the subsequent steps of applicant's process.

Rice is particularly difficult to prepare satisfactorily either in the home or the restaurant kitchen. In tends to become sticky and gummy with other than skilled and experienced preparation. Moreover, different varieties of rice require quite different handling, and as the average rice purchaser knows little about different rice varieties and their methods of preparation, an object of this invention is to prepare a precooked, dehydrated rice product which may be regenerated into a highly satisfactory, uniform product in the average kitchen by a simple, standardized cooking procedure which will yield a fluffy, tender rice preparation in which the grains stand apart instead of being cooked into a sticky, gummy product which consists largely of conglomerates and broken grains.

The product cannot be made from rice which has not been subjected to the pregelatinizing process for the reason that ordinary uncooked raw rice, whether in the paddy or milled rice state will not expand under the conditions of the process of this invention, but instead will "check" under the influence of heat. This "checking" is the formation of transverse lines of cleavage or cracks which cause the rice kernel to break into smaller particles. However, broken head rice if parboiled or cooked and dried as above described is suitable for the practice of applicant's invention.

Generally stated and in accordance with an illustrative embodiment of this invention, gelatinized rice grains having a moisture content are injected into a fluidizing gas stream which is maintained at a temperature sufficient to vaporize and cause escape of moisture from and to expand rice grains; and the gas stream is caused to move at a velocity sufficient to suspend and carry the expanded rice grains therealong to the terminus of the gas stream and to separate the expanded rice grains from the unexpanded rice grains. The temperature of the gas stream may be controlled in accordance with the desired expansion of the rice grains. The velocity of the gas stream may be controlled in order to govern therein the residence and the retention of the rice grains. The temperature of the gas stream may be controlled by adding thereto at its origin, another gas of a different or lower temperature than that at the origin. The gas stream may be returned in a cycle from its terminus back to its origin. The fluidizing gas stream may comprise the combustion products of a fuel and of an oxidizer, and the desired whiteness of the rice product may be controlled by and brownness of the rice product may be controlled by varying the proportion of the oxidizer to the fuel. The fluidizing gas stream may have imparted to it a spirally swirling movement.

A novel feature of applicant's process is the use of a stream of hot gases of controlled composition at such temperatures and at velocities which will suspend and expand the rice particles in a fluidized stream, and thus will effectively separate the expanded from the unexpanded rice and carry the former out of the apparatus to an overheated pipe leading to a suitable collector and separator. The process is continuous and fully automatic, requiring no labor to operate it. The degree of expansion of the rice due to the formation of steam from the moisture within the rice kernel may be controlled by adjustment of the temperature of the fluidizing gas stream, its composition and its velocity in feet per second.

Another novel feature of applicant's process is the control of the residence time of the rice kernels within the fluidizing column independently of the gas composition and velocity, as by the use of deflectors within the column which impart a rotary, swirling motion to the rice kernels in contact with the fluidizing gas stream. This assures sufficient residence time by the kernels within the expanding zone of the column to produce the desired expansion effect, and enables the work to be accomplished in a much shorter apparatus then if the residence time were acquired by passing the rice kernels at high velocity in a straight line path through the column. These deflector vanes for the gas stream may be either of the adjustable angle-of-inclination type or else may be of the stationary, fixed type having one predetermined angle of inclination. In the latter case, deflectors with blades set at various angles are inserted to obtain the desired result.

Another feature of applicant's process is the use of a controlled composition gas mixture as the fluidizing medium. This not only provides a medium with the maximum carrying capacity for the rice particles at any given temperature and velocity, but also allows full control of the whiteness of the finished product by limiting the browning effect of heat in the presence of oxidizing gases. Of course, if a toasted color and flavor is desirable, the fluidizing gas stream need not be controlled as to its oxygen content; instead, its oxygen content should be as high as possible by the use of large excesses of air in the combustion products which form the heated, fluidizing gas stream.

Gelatinization of the rice kernels followed by drying to a moisture content within the range of 10 to 20 percent, for example, between 12 and 15 percent, produces a tough, hard and cohesive structure which when warm becomes quite flexible. This allows the expansion of the moisture into steam which in escaping swells and puffs the rice kernels to approximately five to six times their normal volume. This effect is accompanied by a marked decrease in specific gravity for the expanded particles which, as it occurs in the fluidized state, provides a ready means of classification and air separation of the lighter expanded particles from the entering feed stream of gelatinized, dried rice. This reduction in the bulk density of the expanded particles to only one fifth to one sixth of their original density, together with the centrifugal effect imparted by the deflector vanes, provides an extremely accurate separation of the expanded from the unexpanded rice particles long before any of the particles exit from the column and enter the pipe or other conduit to the cyclone separator.

The product from applicant's process is characterized by its extreme uniformity in degree of precooking, color and density. Aside from the initial barboiling or precooking which the feed stock to the process has received, it is further cooked and rendered extremely porous and fluffy by the heating of its residual moisture by the fluidizing gas stream, and the escape of a substantial portion of this residual water from the expanded rice kernels. This property greatly facilitates the preparation of the rice in final cooked form for the household table, in commercial kitchens and in food processing plants.

In general, the temperature of the fluidizing gas stream will range between 300° F. and 850° F., the exact temperature being determined by the moisture content of the rice feed to the apparatus, the variety of rice whether of the long, medium or short grained type, the individual characteristics of the apparatus used, and the composition, particularly as to free oxygen content, of the fluidizing gas stream. Likewise, is determined the residence time in the expanding zone which may range from one half to three seconds, this depending on the temperature and gas velocity used. Velocities may range between 35 and 175 or even up to 200 feet per second, this depending primarily on the diameter of the fluidizing column and its overall height, and secondarily on the temperature, density and viscosity of the transporting gas stream. If such velocities as are indicated in the upper range are used, it is obvious that extremely tall columns would be required to provide even the minimum residence time for the rice particles, and it is for this reason advantageous to provide one or more column sections with deflector vanes to cause the air stream and rice particles to swirl spirally for a number of revolutions before passing to the next section and finally out of the column to the cyclone separator. To minimize attrition losses from the rice particles and to prevent them from sticking and scorching, particularly within the higher temperature and velocity ranges, the apparatus should be constructed with smooth interior walls and carefully machined and beveled edges on the deflector vanes. There should be no flat spots and dead areas where rice particles may lodge and reside when protected from the upward moving gas stream, as this results in overheated, discolored particles which ultimately dislodge and leave the apparatus to appear as a contaminant of the finished product.

The following description and examples are representative of various illustrative embodiments of this process. It will be understood, however, that other feed rates, temperatures, gas velocities, etc., and equivalent means of supplying the transporting gas stream or cooling of the product may be used within the scope of the appended claims without departing from the spirit and intent of this invention.

In the drawing, FIG. 1 is a diagram of an illustrative apparatus.

In the specific examples which follow, use is made of the apparatus which is assembled in accordance with the process flow diagram in the FIG. 1. Parboiled or precooked and dried milled rice having a moisture content of from 10 to 20 percent, and preferably within the range of 12 to 15 percent, may be prepared in a suitable apparatus such as is described in applicant's Serial No. 9,574, filed February 18, 1960, or else commercially parboiled and predried, milled rice may be used.

The pregelatinized and partially dried rice, having a moisture content within the above described range, is charged into rice feed hopper 32 and the tight fitting hopper cover 32a is clamped on. A fluidizing gas stream comprises the combustion products of a fuel and an oxidizer attained as follows: A combustion gas mixture is generated in combustion chamber 8 by burning a mixture of liquid or gaseous fuel and air in burner 9. The fuel, such as natural gas, enters from pipe 10 after having passed through open block valve 22, pressure control valve 23 and safety switch valve 19, which is operated by combustion safety controller 16. The latter is electrically connected to horn alarm 17 and safety lights 18 and 18a. The controller is actuated by the combustion safety device 15 which consists of a fire rod which generates a weak electric current when in contact with flame from the burner 9. Combustion safety controller 16 receives the electrical impulse and will allow combustion safety valve 19 to remain open only when the burner is lighted. This flame rod may be actuated from the main burner flame, or from a flame pilot. If the flame rod detects no flame, combustion safety controller 16 will close valve 19, sound horn alarm 17 and flash red warning light 18a. The burner or flame pilot must then be manually relighted.

The fuel and air in the combustion mixture are proportioned by the settings of the respective fuel valve 12 and combustion air valve 12a which are operated together by the ratio control valve operator 13. The linkage between the respective valves may be set to provide any desired composition in the combustion products and to control the percentage of free oxygen. While other more complex ratio controllers may be used which control these valves from an oxygen recorder-controller, it is quite satisfactory to manually set these valves by Orsat analysis of the combustion gases. Moreover, since as will be later described, so much of the gas stream is either recycled as a temperature quench within the combustion chamber 8 or use is made of low pressure steam, or a mixture of the two, the actual free oxygen content of the fluidizing gas stream may be controlled within narrow limits without using an elaborate ratio control system at the burner 9. It is possible to control the free oxygen within the limits of 0.1 to 1.0 percent by volume in the fluidizing gas stream without combustion difficulties in the burner.

Air for combustion is supplied by primary air fan 24 through pipe 11 and open block valve 25 to air valve 12a which is ganged with fuel valve 12 to ratio control valve operator 13. The latter is controlled by temperature recorder-controller 14 which receives its control impulse from temperature sensing element 14a through a thermal capillary system. With controller 14 set to maintain a definite temperature within appropriate limits in the gas stream leaving the fluidizing zone 1, the amount of fuel-air mixture entering burner 9 is controlled by the ratio control valve operator 13 which is linked to the ganged fuel and air valves 12 and 12a, respectively.

Since the theoretical flame temperature of a stoichiometrically proportioned mixture of natural gas and air is about 3700° F., it is necessary to use a quench gas of lower temperature to reduce the temperature of the transporting gas stream to within the desired processing limits, usually between 300° F. and 850° F., the exact temperature depending on such factors as column height; the amount, temperature and moisture content of the entering rice; insulation efficiency and the setting of the deflector vanes within the fluidizing zone, in addition to the heat carrying and heat transfer characteristics of the transporting gas stream, itself. This quench gas may be the recycled transporting gas mixture which leaves the fluidizing zone 1 through pipe 6, and after being separated from the expanded rice in cyclone separator 7 is recycled through pipe 33, air filter 34 and orifice plate 35 by means of gas blower 36, which is driven by motor 36a. The recycled gas stream passes from the blower through pipe 37 and flow control valve 38 into pipe 43 which connects to combustion chamber 8 where it mixes with the combustion products from burner 9 and enters pipe 26, passes successively through straightening vanes 27, orifice 28, flanges 29, pipe 5, deflector vanes 3 and a pair of flanges between which is inserted an alloy wire mesh or perforated metal screen 4. At this point, the transporting gas mixture encounters the rice feed stream originating from hopper 32, the feed rate of which is controlled by vibrating feeder 31, which is regulated by vibrator 31a, which discharges the rice through pipe 30 into the fluidizing chamber. Pipe 30 is preceded by a Y fitting 30a which has one outlet blanked. This fitting is equipped with an internal flap which allows the feed stream to be diverted to the outside of the apparatus for weighing when calibrating the feed rate.

Simultaneous with, or separately a low pressure steam quench may be introduced from pipe 45 through pressure control valve 44 into combustion chamber 8. The amount of steam so admitted is controlled by pressure controller 46 which senses pressure conditions within combustion chamber 9 through pipe 47 and open block valve 48. If recycled transporting gas is being simultaneously admitted through flow control valve 38 by the setting used on flow controller 39, which in turn operates from flow transmitter 40 which is controlled by the upstream-downstream pressure differential through orifice 28, the amount of steam entering combustion chamber 8 is determined by the differential between the setting of pressure controller 46, and the gas pressure within combustion chamber 8 which originates from the combustion gas pressure delivered by burner 9 plus the pressure contributed by the recycled gas stream received through pipe 43. Since flow controller 39 is in effect a velocity controller, the flow of the total gas mixture into the fluidizing zone is largely determined by its setting. If it is set to admit less recycle gas through flow control valve 38 than is required to maintain the desired pressure within the gas mixing section of combustion chamber 9, the remaining pressure up to the pressure setting of pressure controller 46 will be supplied by steam though pressure control valve 44 and pipe 45. However, if the gas recycle system is shut off entirely, the steam quench system will provide the necessary quench gas and driving force through the fluidizing zone. Likewise, the steam quench system can be shut off entirely and the system controlled through the gas recycle system. Whether used in conjunction with each other, or separately, each acts with the temperature recorder-controller 14 to provide a transporting gas stream of suitable composition, temperature, volume and velocity to function properly in the fluidizing zone 1.

It is, of course, possible to admit outside air as the quench medium through valve 53 which is also attached to combustion chamber 8. In fact, this may be an advantageous method of operation where toasting of the expanded rice product is desirable. Moreover, it provides a convenient means of starting up the system before the rice feed is started. Once, however, the recycled gas stream is established, or steam is admitted through pipe 45, valve 53 is partially or entirely closed so as to provide a transporting gas stream of the composition which is normally desirable, i.e., one in which the residual free oxygen content is quite small.

The rice which enters the fluidizing zone, and is transported upward through this series of chambers 2, passes through one or more sets of deflector vanes 3 to set its movement in a spiralling pattern through a sufficient number of chambers 2 to afford the necessary residence or retention of the rice grains in the gas stream in order to effect the desired expansion of the rice kernels, after which it passes out of the upper chamber into pipe 6 and thence into cyclone separator 7 and collects in hopper 49. The fluidizing gas stream has its origin at 8 and the rice grains enter the stream at 4 and are carried along 2, 3 and 6 to 7 which latter is the terminus of the gas stream carrying the rice grains. From the terminus 7 the gas stream is returned in a cycle, via 33, 34, 35, 36, 37 and 43 back to the origin at 8. The temperature of the gas stream is controlled by adding to it at its origin 8, a gas such as air or stream of a different or lower temperature than that at the origin 8. Rotary air lock 50 withdraws the hot expanded rice into cooler 51 which discharges into storage hopper 52. It is then withdrawn from hopper 52 as desired for packaging. Cooler 51 may cool the rice through any suitable means of heat exchange with fluid or gaseous heat exchange media such as water, air or refrigerants. When very light colored products are desired, the product should be cooled to below 200° F. before being allowed to contact air. If the rice is to remain in storage hopper 52 for more than an hour without being steadily removed and replaced by an incoming stream, cooling to considerably lower temperatures in the range of 100° F. to 140° F. is preferred. If, however, the rice product has been prepared in contact with a transporting gas stream which has a high free oxygen content, and a very light color is not an objective the temperature to which the product is cooled is dictated more by convenience in handling and packaging than by any other consideration.

In the following tabulation are given three examples of the application of applicant's process and apparatus to rice samples processed under specific conditions.

|  | Example 1 | Example 2 | Example 3 |
|---|---|---|---|
| Rice Type and Variety | Long Grained Patna. | Long Grained Blue Bonnet. | Long Grained Patna. |
| Rate, Lbs./Hr | 6.3 | 7.8 | 9.1 |
| Fluid. Gas, ° F. Input | 875 | 860 | 850 |
| Fluid. Gas, ° F. Output | 455 | 450 | 405 |
| Gas Velocity, Ft./Sec.¹ | 138 | 148 | 158 |
| Average Product Temp., ° F | 500 | 500 | 500 |

¹ Velocity measurement in feed chamber comprising lower section of fluidizing column.

Subsequent data obtained in a larger, fully instrumented process installation having an hourly capacity of approximately 100 lbs./hr. yielded similar data, except for somewhat lower input and exist gas temperatures and lower product temperatures when producing an equivalent product, due to longer retention periods within the larger diameter fluidizing zone, better insulation of the fluidizing column, and better instrument control of the fluidizing gas composition, temperature and velocity through the column.

It will be understood by those skilled in the art that while there has been described in considerable detail a suitable apparatus and one applicable instrumentation control scheme, variations in construction and other equivalent instrumentation schemes may be employed within the scope of the appended claims without departing from the spirit and intent of this invention. The principles of this invention contemplate the employment of a fluidizing zone, a suitable transporting gas mixture having the desired characteristics of composition, temperature, heat transfer capacity and velocity to allow preparation of products of the desired characteristics, and provision of means for separating the product from the gas transporting stream and returning the latter in a recycle operation together with steam, or in lieu thereof, to mix with fresh combustion products to continuously control the temperature and other characteristics of the transporting gas stream again entering the fluidizing zone. The apparatus and process of use are both fully automatic and continuous in operation, and therefore do not require operating labor.

An advantage of the process disclosed is its selective, continuous operation wherein the rice remains in the column in contact with the fluidizing, controlled composition, gas stream until its moisture content and thereby its porosity, specific density and buoyancy in the gas stream are reduced to the point where it will be carried out of the column to the overhead collector. This prevents, as occurs in batch operations, the preparation of a mixture of dried grains having varying degrees of dryness, porosity and color. This uniformity and the absence of horny, translucent grains which invariably occur in any batch operation, are important in the production of a saleable commercial product.

Having thus described the invention, what is claimed is:

1. The process of preparing an expanded rice product, comprising, injecting gelatinized rice grains having a moisture content, into a fluidizing gas stream which is maintained at a temperature sufficient to vaporize and cause escape of moisture from and to expand rice grains, and causing the gas stream to move at a velocity sufficient to suspend and carry the expanded rice grains therealong to the terminus of the gas stream and to separate expanded rice grains from unexpanded rice grains.

2. The process of preparing an expanded rice product, comprising, injecting gelatinized rice grains having a moisture content, into a fluidizing gas stream which is maintained at a temperature sufficient to vaporize and cause escape of moisture from and to expand rice grains, causing the gas stream to move at a velocity sufficient to suspend and carry the expanded rice grains therealong to the terminus of the gas stream and to separate expanded rice grains from unexpanded rice grains, and controlling the temperature of the gas stream in accordance with the desired expansion of the rice grains.

3. The process of preparing an expanded rice product, comprising, injecting gelatinized rice grains having a moisture content, into a fluidizing gas stream which is maintained at a temperature sufficient to vaporize and cause escape of moisture from and to expand rice grains, causing the gas stream to move at a velocity sufficient to suspend and carry the expanded rice grains therealong to the terminus of the gas stream and to separate expanded rice grains from unexpanded rice grains, and controlling the velocity of the gas stream in order to govern therein the residence and the retention of the rice grains.

4. The process of preparing an expanded rice product, comprising, injecting gelatinized rice grains having a moisture content, into a fluidizing gas stream which is maintained at a temperature sufficient to vaporize and cause escape of moisture from and to expand rice grains, causing the gas stream to move at a velocity sufficient to suspend and carry the expanded rice grains therealong to the terminus of the gas stream and to separate expanded rice grains from unexpanded rice grains, and controlling the temperature of the gas stream by adding thereto at its origin another gas of a different temperature than that at the origin.

5. The process of preparing an expanded rice product, comprising, injecting gelatinized rice grains having a moisture content, into a fluidizing gas stream which is maintained at a temperature sufficient to vaporize and cause escape of moisture from and to expand rice grains, causing the gas stream to move at a velocity sufficient to suspend and carry the expanded rice grains therealong to the terminus of the gas stream and to separate expanded rice grains from unexpanded rice grains, and returning the gas stream in a cycle from its terminus back to its origin.

6. The process of preparing an expanded rice product, comprising, injecting gelatinized rice grains having a moisture content, into a fluidizing gas stream comprising the combustion products of a fuel and of an oxidizer and which is maintained at a temperature sufficient to vaporize and cause escape of moisture from and to expand rice grains, and causing the gas stream to move at a velocity sufficient to suspend and carry the expanded rice grains therealong to the terminus of the gas stream and to separate expanded rice grains from unexpanded rice grains.

7. The process of preparing an expanded rice product, comprising, injecting gelatinized rice grains having a moisture content, into a fluidizing gas stream comprising the combustion products of a fuel and of an oxidizer and which is maintained at a temperature sufficient to vaporize and cause escape of moisture from and to expand rice grains, causing the gas stream to move at a velocity sufficient to suspend and carry the expanded rice grains therealong to the terminus of the gas stream and to separate expanded rice grains from unexpanded rice grains, and controlling the desired whiteness and brownness of the rice product by varying the proportion of the oxidizer to the fuel.

8. The process of preparing an expanded rice product, comprising, injecting gelatinized rice grains having a moisture content, into a spirally swirling fluidizing gas stream which is maintained at a temperature sufficient to vaporize and cause escape of moisture from and to expand rice grains, and causing the gas stream to move at a velocity sufficient to suspend and carry the expanded rice grains therealong to the terminus of the gas stream and to separate expanded rice grains from unexpanded rice grains.

References Cited in the file of this patent

UNITED STATES PATENTS

| | | |
|---|---|---|
| 2,785,070 | Kester et al. | Mar. 12, 1957 |
| 2,808,333 | Mickus et al. | Oct. 1, 1957 |
| 2,863,375 | Long et al. | Dec. 9, 1958 |
| 2,922,355 | Green | Jan. 26, 1960 |